(12) United States Patent
Aschwanden et al.

(10) Patent No.: US 8,755,124 B2
(45) Date of Patent: Jun. 17, 2014

(54) ADJUSTABLE OPTICAL LENS

(71) Applicant: Optotune AG, Dietikon (CH)

(72) Inventors: Manuel Aschwanden, Allenwinden (CH); Chauncey Graetzel, Zurich (CH); Thomas Kem, Zurich (CH); Pit Gebbers, Glattbrugg (CH)

(*) Notice: Subject to any disclaimer, the term of this patent is extended or adjusted under 35 U.S.C. 154(b) by 99 days.

(21) Appl. No.: 13/683,758

(22) Filed: Nov. 21, 2012

(65) Prior Publication Data

US 2013/0114148 A1 May 9, 2013

Related U.S. Application Data

(63) Continuation of application No. PCT/CH2011/000112, filed on May 16, 2011.

(30) Foreign Application Priority Data

Jun. 2, 2010 (EP) .................................... 10005719

(51) Int. Cl.
*G02B 1/06* (2006.01)
*G02B 3/12* (2006.01)
*G02B 26/00* (2006.01)

(52) U.S. Cl.
CPC .................... *G02B 26/004* (2013.01)
USPC .......................................... 359/666; 359/665

(58) Field of Classification Search
CPC ................................. G02B 26/004; G02B 3/14
USPC .................................................... 359/665, 666
See application file for complete search history.

(56) References Cited

U.S. PATENT DOCUMENTS

| 2,062,468 A | 12/1936 | Matz et al. |
| 4,572,616 A | 2/1986 | Kowel et al. |
| 4,783,153 A | 11/1988 | Kushibiki et al. |
| 4,783,155 A | 11/1988 | Imataki et al. |
| 4,802,746 A | 2/1989 | Baba et al. |
| 5,138,494 A | 8/1992 | Kurtin |
| 5,212,583 A | 5/1993 | Vali et al. |
| 5,446,591 A | 8/1995 | Medlock |
| 5,917,657 A | 6/1999 | Kaneko et al. |
| 5,999,328 A | 12/1999 | Kurtin et al. |

(Continued)

FOREIGN PATENT DOCUMENTS

| EP | 2282226 A1 | 2/2011 |
| ES | 2332761 A1 | 2/2010 |

(Continued)

OTHER PUBLICATIONS

Aschwanden et al., Low voltage, highly tunable diffraction grating based on dielectric elastomer actuators, Proc. of SPIE, 6524: 1-10 (2007).

(Continued)

*Primary Examiner* — William Choi
(74) *Attorney, Agent, or Firm* — Marshall, Gerstein & Borun LLP; Michael P. Furmanek

(57) ABSTRACT

The disclosure provides an adjustable optical lens comprising a membrane, a support for the membrane, a fluid between the membrane and the support, an actuator for deforming the membrane, and a rigid ring connected to the membrane for moving with the membrane for ensuring that a section of the membrane surrounded by the rigid ring has a defined circumference.

17 Claims, 11 Drawing Sheets

(56) References Cited

U.S. PATENT DOCUMENTS

| | | |
|---|---|---|
| 6,033,132 A | 3/2000 | Seo |
| 6,040,947 A | 3/2000 | Kurtin et al. |
| 6,376,971 B1 | 4/2002 | Pelrine et al. |
| 6,538,823 B2 | 3/2003 | Kroupenkine et al. |
| 6,715,876 B2 | 4/2004 | Floyd |
| 6,859,333 B1 | 2/2005 | Ren et al. |
| 6,864,951 B1 | 3/2005 | Ren et al. |
| 7,027,683 B2 | 4/2006 | O'Connor et al. |
| 7,079,203 B1 | 7/2006 | Huang et al. |
| 7,085,065 B2 | 8/2006 | Silver |
| 7,209,280 B2 | 4/2007 | Goossens |
| 7,643,217 B2 | 1/2010 | Yokoyama et al. |
| 7,660,025 B2 | 2/2010 | Kim et al. |
| 7,672,059 B2 | 3/2010 | Batchko et al. |
| 7,675,686 B2 | 3/2010 | Lo et al. |
| 7,768,712 B2 | 8/2010 | Silver et al. |
| 7,826,145 B2 | 11/2010 | Justis et al. |
| 7,920,330 B2 | 4/2011 | Aschwanden et al. |
| 8,027,096 B2 * | 9/2011 | Feng et al. .................. 359/666 |
| 8,169,715 B2 | 5/2012 | Kinoshita et al. |
| 2002/0118464 A1 | 8/2002 | Nishioka et al. |
| 2002/0154380 A1 | 10/2002 | Gelbart |
| 2003/0147046 A1 | 8/2003 | Shadduck |
| 2004/0001180 A1 | 1/2004 | Epstein |
| 2004/0174610 A1 | 9/2004 | Aizenberg et al. |
| 2005/0030438 A1 | 2/2005 | Nishioka |
| 2005/0100270 A1 | 5/2005 | O'Connor et al. |
| 2006/0061729 A1 | 3/2006 | Shadduck |
| 2006/0087614 A1 | 4/2006 | Shadduck |
| 2006/0164593 A1 | 7/2006 | Peyghambarian et al. |
| 2006/0164731 A1 | 7/2006 | Wu et al. |
| 2007/0120438 A1 | 5/2007 | Divoux |
| 2007/0263293 A1 | 11/2007 | Batchko et al. |
| 2008/0112059 A1 | 5/2008 | Choi et al. |
| 2008/0144185 A1 | 6/2008 | Wang et al. |
| 2008/0204909 A1 | 8/2008 | Shiota et al. |
| 2008/0259463 A1 | 10/2008 | Shepherd |
| 2009/0052049 A1 | 2/2009 | Batchko et al. |
| 2009/0161239 A1 | 6/2009 | Verhaar et al. |
| 2010/0118414 A1 | 5/2010 | Bolis |
| 2010/0195213 A1 | 8/2010 | Bolis |
| 2010/0202054 A1 | 8/2010 | Niederer |
| 2010/0232030 A1 | 9/2010 | Dobrusskin |
| 2011/0032624 A1 | 2/2011 | Bolis et al. |

FOREIGN PATENT DOCUMENTS

| | | |
|---|---|---|
| GB | 1327503 A | 8/1973 |
| JP | 60-220301 A | 11/1985 |
| JP | 1-166003 A | 6/1989 |
| JP | 1-166004 A | 6/1989 |
| JP | 8-114703 A | 5/1996 |
| JP | 10-144975 A | 5/1998 |
| JP | 11-133210 A | 5/1999 |
| JP | 2000-081504 A | 3/2000 |
| JP | 2002-131513 A | 5/2002 |
| JP | 2002-357774 A | 12/2002 |
| JP | 2003-114309 A | 4/2003 |
| JP | 2005-099568 A | 4/2005 |
| JP | 2008-058841 A | 3/2008 |
| WO | WO-2005/040909 A1 | 5/2005 |
| WO | WO-2005/085930 A1 | 9/2005 |
| WO | WO-2005/119307 A1 | 12/2005 |
| WO | WO-2008138010 A1 | 11/2008 |

OTHER PUBLICATIONS

Binh-Khiem et al., Polymer thin film deposited on liquid for varifocal encapsulated liquid lenses, Applied Physics Letters, 93:1-3 (2008).

Brenner et al., Optimum design of an electrostatic zipper actuator, NSTI-Nanotech, 2: 371-374 (2004).

European Search Report and Annex in corresponding EP 10 00 5719 dated Jul. 21, 2010.

European Search Report and Annex in corresponding EP 10 00 5720 dated Jul. 23, 2010.

Graham-Rowe, Liquid lenses make a splash, Nature Publishing Group, Nature Photonics, 1-3 (2006).

International Search Report in corresponding PCT/CH2008/000342 dated Nov. 18, 2008.

poLight, We are now poLight—Ignis display AS renames to poLight AS, www.polight.com.

Rangsten et al., Electrostatically excited diaphragm driven as a loudspeaker, Sensors and Actuators A, 52: 211-215 (1996).

Ren et al., Tunable-focus liquid lens controlled using a servo motor, Optics Express, 14(18): 8031-8036 (2006).

Rosset et al., Mechanical properties of electroactive polymer microactuators with ion-implanted electrodes, Proc. of SPIE, 6524: 1-11 (2007).

Saif, M.T.A. et al., Analytical Modeling of Electrostatic Membrane Actuator for Micro Pumps, Journal of Microelectromechanical Systems, 8(3): 3 (1999) (abstract only).

Schneider et al., Adaptive fluidic PDMS-lens with integrated piezoelectric actuator, IEEE, MEMS: 120-123 (2008).

Seemann et al., Local surface charges direct the deposition of carbon nanotubes and fullerenes into nanoscale patterns, Nano Letters, 7(10): 3007-3012 (2007).

Syms et al., Surface tension-powered self-assembly of microstructures—the state-of-the-art, Journal of Microelectromechanical Systems, 12(4): 387-417 (2003).

Written Opinion in corresponding PCT/CH2011/000112 dated Jul. 6, 2011.

Yuan et al., Self-clearable carbon nanotube electrodes for improved performance of dielectric elastomer actuators, Proc of SPIE, 6927: 1-12 (2008).

Zhang et al., Fluidic adaptive lens with high focal length tunability, Applied Physics Letters, 82(19): 3171-3172 (2003).

International Search Report in corresponding PCT/CH2011/000112 mailed Jul. 6, 2011.

* cited by examiner

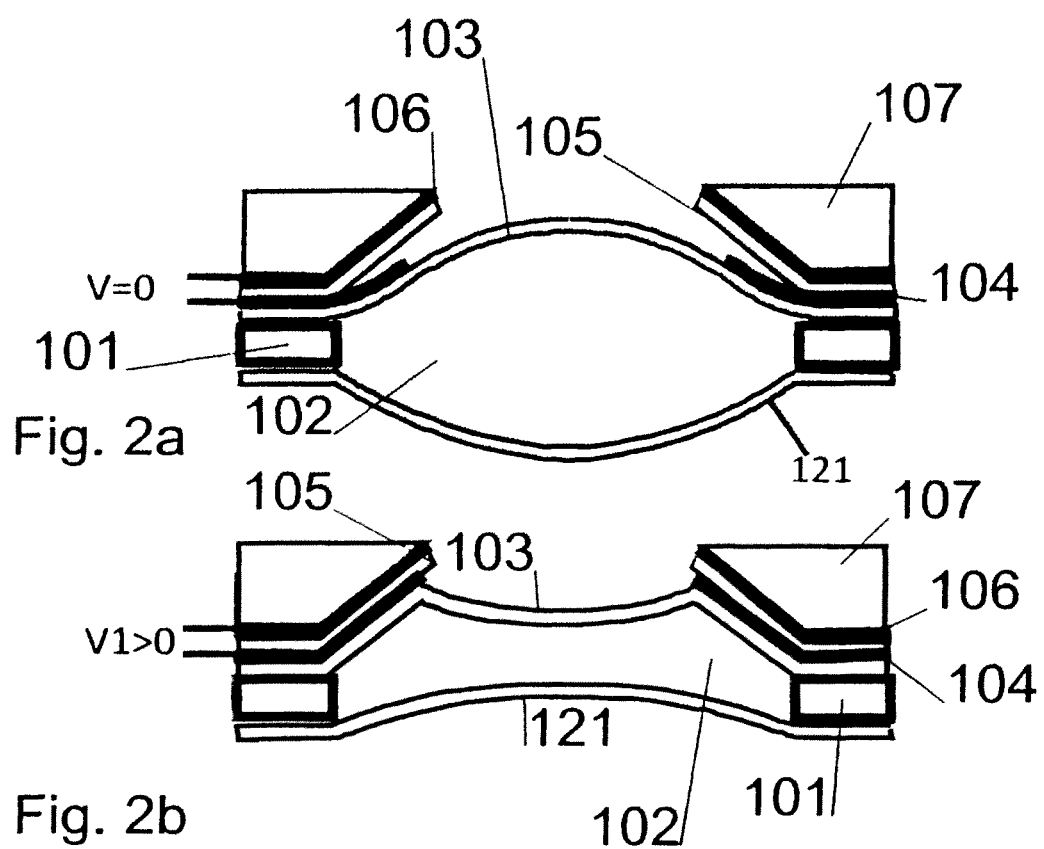

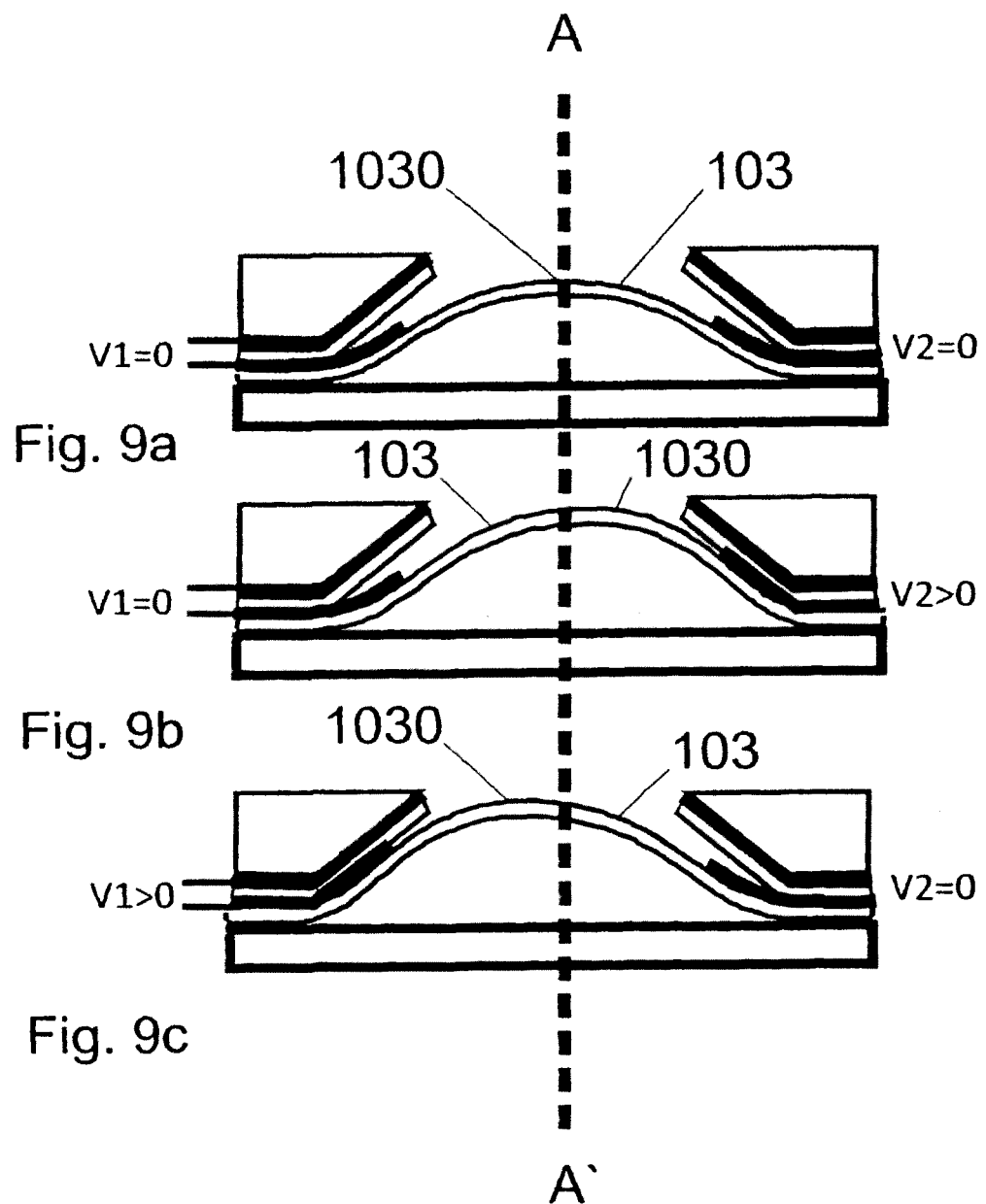

ADJUSTABLE OPTICAL LENS

TECHNICAL FIELD

The invention relates to an adjustable optical lens, as well as to methods for operating and fabricating such a device.

BACKGROUND ART

An adjustable optical lens is an optical device which may be adjusted for varying the focal length as well as the lateral position of the center of optical axis of the device. Such lenses are also known as varifocal displacement lenses provided they can adjust to multiple different focal points.

WO 2008/138010 A1 discloses an adjustable lens comprising a rigid base, a deformable membrane on top of the base, and a fluid in between the base and the membrane. A first electrode is attached to the membrane while a second electrode of an electrostatic actuator is attached to the base.

Such a lens constitutes a relatively thick device.

In addition, the lens according to the art is limited in its applications since the portion of the membrane that is elevated provides for a peak during elevation which peak persistently is well-centred. However, for some applications in optics it would be desirable to provide for off-centred peaks of the membrane in order to compensate for other optical effects such as shacking, arising in the optical system.

DISCLOSURE OF THE INVENTION

The problem to be solved by the present invention is therefore to provide an adjustable optical lens which is a compact assembly.

Another problem to be solved by the present invention is to provide an adjustable optical lens including a membrane having a peak which may be shifted laterally for compensation purposes.

According to a first aspect of the present invention, there is provided an adjustable optical lens according to the features of claim 1.

Accordingly, the adjustable optical lens comprises a membrane, a support for the membrane, a fluid between the membrane and the support, and an actuator for deforming the membrane, the actuator comprising a first electrode interconnected to the membrane, and a second electrode. The second electrode is arranged above the membrane such that the first electrode is arranged between the support and the second electrode.

For the reason that there is no electrode provided between the support and the membrane, the lens exhibits a lower thickness for the reason the second electrode instead is making use of the space that needs to be provided for the elevation of the membrane anyway. In addition, the lens can deform from convex to concave. This is not possible when the electrostatic attraction is between a deformable electrode, which is applied on the fluid side of the membrane, and a rigid electrode applied to the support as described in the prior art. Furthermore, no fluid can be enclosed in between the electrodes and therefore, no variation of the thickness of an insulation layer between the electrodes can occur due to fluid enclosure resulting in an actuation not providing for the desired optical properties.

In a preferred embodiment, a holder for the second electrode is arranged above the membrane. An assembly comprising the holder, the second electrode, and advantageously an insulation layer my form a prefabricated assembly. Such assembly may be applicable to many different membrane/ support assemblies, and may form a standard assembly for optical lenses irrespective of specific properties of such lenses. When it comes to manufacturing, the sealing of the fluid normally is a low yield process. If the costly deposition processes for the second electrode and the insulation layer do not need to be done on the support, the overall costs after yield lost can be improved.

According to another aspect of the present invention, there is provided an adjustable optical lens, comprising a membrane, a support for the membrane, a fluid between the membrane and the support, and an actuator for deforming the membrane, the actuator comprising a first and a second electrode. The second electrode comprises first segments with a first conductivity and at least one second segment with a second conductivity. The first conductivity exceeds the second conductivity. Each one of the second segments is arranged between two of the first segments.

When a voltage is applied between the first electrode and a first segment of the second electrode, and a different voltage is applied between the first electrode and another first segment of the second electrode, then across the two first segments being neighboring first segments connected by a single second segment only a voltage gradient builds up. Depending on the locally varying voltage between the second segment of the second electrode and the first electrode, the Coulomb attraction force between the first electrode and the second electrode varies with location. This results in a non-radial deformation of the lens, i.e. a peak in e.g. the convex shape of the membrane is moved out of its centered position. This non-radial deformation can be used to laterally move the optical axis of the lens.

According to another aspect of the present invention, there is provided a method for operating an adjustable lens. The lens comprises a membrane with an interior and a periphery, a support for the membrane, a fluid between the membrane and the support, and an actuator for deforming the membrane, the actuator comprising a first electrode interconnected to the membrane, and a second electrode, the second electrode being arranged above the membrane such that the first electrode is arranged between the support and the second electrode. A first voltage is applied between the first electrode and the second electrode for moving the periphery of the membrane away from the support for effecting a moving of the interior of the membrane towards the support. A second voltage is applied between the first electrode and the second electrode for moving the periphery of the membrane towards the support for effecting a moving of the interior of the membrane away from the support. Especially, the second voltage is different to the first voltage and may specifically be a zero voltage.

According to another aspect of the present invention, there is provided another method for operating an optical lens. The lens comprises a membrane, a support for the membrane, a fluid between the membrane and the support, an actuator for deforming the membrane, the actuator comprising a first and a second electrode, wherein the second electrode comprises first segments with a first conductivity and at least one second segment with a second conductivity, wherein the first conductivity exceeds the second conductivity, and wherein each one of the second segments is arranged between two of the first segments. A first voltage is applied between the first electrode and a first one of the first segments of the second electrode. A second voltage is applied between the first electrode and a second one of the first segments of the second electrode. The first and the second ones of the first segments are neighbouring segments and connected via a second segment. The first voltage is different from the second voltage.

According to a further aspect of the present invention, there is provided a method for fabricating an adjustable optical lens. The method includes filling a fluid into a support, attaching a membrane interconnected with a first electrode to the support, and arranging a pre-fabricated holder including a second electrode and an insulation layer on top of the second electrode.

Other advantageous embodiments are listed in the dependent claims as well as in the description below. The described embodiments similarly pertain to the apparatus and the methods. Synergetic effects may arise from different combinations of the embodiments although they might not be described in detail.

Further on it shall be noted that all embodiments of the present invention concerning a method might be carried out with the order of the steps as described, nevertheless this has not to be the only essential order of the steps of the method all different orders of orders and combinations of the method steps are herewith described.

BRIEF DESCRIPTION OF THE DRAWINGS

The aspects defined above and further aspects, features and advantages of the present invention can also be derived from the examples of embodiments to be described hereinafter and are explained with reference to examples of embodiments. The invention will be described in more detail hereinafter with reference of examples of embodiments but to which the invention is not limited. Such description makes reference to the annexed drawings, wherein:

FIGS. 2a and 2b show two states of an adjustable optical lens according to another embodiment of the present invention, schematically illustrated in a sectional view, FIGS. 5a and 5b show an adjustable optical lens according to another embodiment of the present invention, wherein FIG. 5a illustrates the lens in a sectional view, and FIG. 5b shows a second electrode of the lens in a top view, FIGS. 6a and 6b show an adjustable optical lens according to another embodiment of the present invention, wherein FIG. 6a illustrates the lens in a sectional view, and FIG. 6b shows a second electrode of the lens in a top view, FIGS. 8a and 8b show an adjustable optical lens according to a further embodiment of the present invention, wherein FIG. 8a illustrates the lens in a sectional view, and FIG. 8b shows a second electrode of the lens in a top view, FIGS. 9a, 9b and 9c illustrate the optical lens of FIG. 8 in three different activation states, all in a sectional view.

MODES FOR CARRYING OUT THE INVENTION

Figures 1A, 1B, 1C:
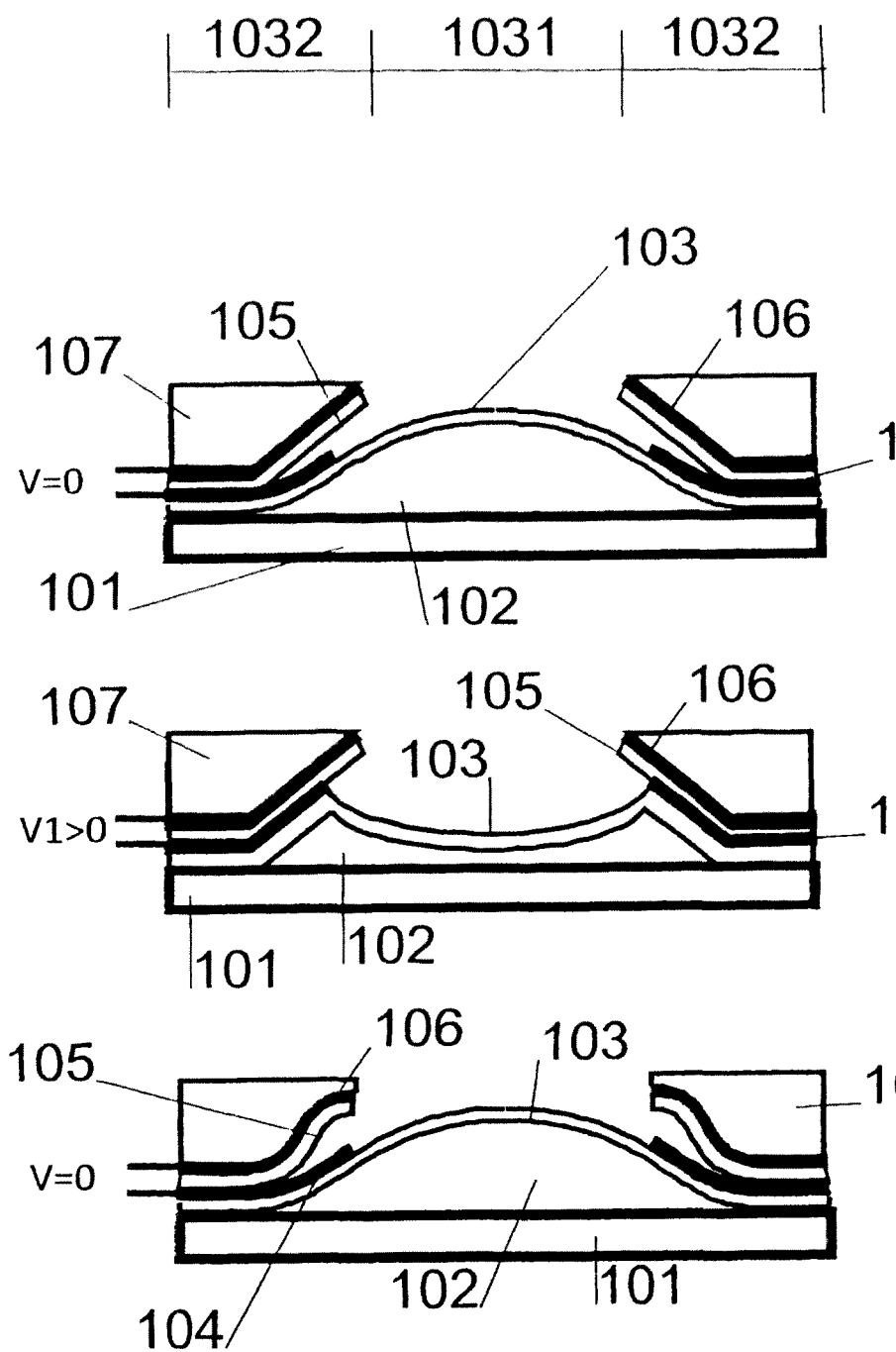
FIGS. 1a, 1b, 1c show states of an adjustable optical lens according to an embodiment of the present invention, schematically illustrated in a sectional view.

Similar or relating elements in the several figures are provided with the same reference numerals.

Definitions

The term "axial" is generally used to designate a direction perpendicular to the surface of the membrane and generally parallel to the direction of the light path. For the reason that the membrane in the present application often takes a convex/concave shape it is assumed that the term axial may also refer to an assumed plain shape of the overall adjustable optical lens, most of the times coinciding with a plain surface of the support, and therefore be defined as a direction perpendicular to such surface. The term "lateral" is used to designate a direction perpendicular to the axial direction, i.e. a direction parallel to the support.

The terms "interior" and "periphery" both refer to portions of the membrane. While the membrane in a relaxed, non-stressed state typically is a plain element of e.g. triangular, rectangular, circular or polygonal shape, such membrane always provides for an inner portion and a periphery portion. Both portions complement each other. The periphery portion surrounds the interior portion. E.g., if the basic shape of the membrane is a circle, the membrane may be divided into the interior taking the form of a circle, and the periphery taking the form of an annulus surrounding the interior. The two portions of the membrane do not necessarily need to form a single piece membrane. In contrast, the membrane may be formed by two individual pieces separated from each other, i.e. the interior piece and the periphery piece are two separate pieces—which advantageously are axially offset with respect to each other. In a lateral dimension, the periphery portion still surrounds the interior portion. Specifically, the two pieces may still fully complement each other, i.e. build a continuous overall membrane when virtually being aligned to the same position on that axis.

A preferred embodiment of the present invention relates to an adjustable optical lens—i.e. adjustable in focal length—comprising a fluid—which is one of a liquid and a gas, and which preferably shows a constant volume—enclosed by a deformable polymer film also referred as deformable membrane—and a rigid support in combination building a container for the fluid. The deformation of the polymer film is achieved by using an electrostatic actuator including two electrodes. Any actuator means preferably engage with the membrane at a periphery portion of the membrane. The generally axial movement of the membrane is based on an electrostatic actuation: Starting in a position where the periphery of the membrane is held in a lower position by the actuator, an axial movement of the periphery of the membrane away from the support results in a lateral displacement of the fluid from the interior of the container to its periphery. In turn, an axial movement towards the support of the periphery of the membrane results in a lateral displacement of the fluid from the periphery of the container to its interior. Therefore, the device is configured such that, when a signal is applied to the actuator, the membrane is moved with respect to the support in its periphery by this causing a deformation of the membrane in its interior such that the interior of the membrane moves towards/away from the transparent support and pushes the fluid out from/into the centre of the container. This, in turn, causes the membrane to switch between a convex and a concave state, and vice versa, respectively, subject to the activation. Advantageously, the first electrode interconnected with the membrane is a deformable electrode, while the second electrode interconnected with the support or a holder or other rigid means shows rigid properties at least after being mounted.

The membrane may advantageously be embodied as a pre-stretched membrane, i.e. a membrane exhibiting tensile stress, and in particular as a polymer film. Advantageously, the membrane is optically transparent. The support may be embodied as a rigid and at least partially transparent support.

The device can be built very compact. Additionally, it comprises only a small amount of parts, making it very cost efficient in production.

The adjustable lens can thus be used for applications ranging from F-number changing cameras in mobile phones, digital cameras, surveillance cameras, illumination systems and many other optical systems, with the F-number known in optics as focal length per diameter of the aperture.

In an advantageous embodiment, the support of the adjustable diaphragm is made of a plastic, glass, metals, or the combination of those. Such materials have characteristics that lead to a good optical quality with simple manufacturing processes.

Advantageously, the membrane has a thickness larger than 100 nm and/or smaller than 5 mm. While the lower boundary provides for ease in manufacturing, the upper boundary may be a limit where forces needed for deformation become difficult to be achieved.

In an advantageous embodiment, the membrane is made of polymers (e.g. PDMS Sylgard 186 by Dow Corning™ or Optical Gel OG-1001 by Litway™) or acrylic elastomers. Such materials allow a substantial deformation.

In a very compact embodiment, the polymer film is deformed through electrostatic forces. A first ring-shaped flexible electrode is applied onto or integrated into the periphery of the polymer film membrane, preferably on the side not in contact with the fluid. A second ring-shaped electrode is put at the periphery of the support, where the support meets the membrane. In between the first and the second ring-shaped electrodes there is provided a thin insulation layer for decoupling the second electrode from the first electrode. The electrodes in combination with the insulator build a zipper actuator. Such zipper actuator may be an element manufactured separate from the rest of the lens, and attached to the membrane during fabrication. When an electrical voltage is applied between the flexible first electrode and the rigid second electrode, electrostatic forces build up and the flexible electrode is attracted towards the second electrode. The deformation of the flexible electrode causes a deformation of the membrane and thus a displacement of the fluid in the container. The displacement of the fluid from the centre of the container to its periphery results in a change of the shape of the membrane.

An advantage of having a separate actuator block comprising of the holder, the second electrode and the insulating layer is the effect that the lens can deform from a convex to ac concave state. This is not possible when the electrostatic attraction is between a deformable electrode, which is applied on the fluid side of the membrane and a rigid electrode applied on the support as described in prior art. Furthermore, no fluid can be enclosed in between the electrodes and therefore, no variation of the insulation layer thickness can happen due to liquid enclosure. Furthermore, the sealing of the liquid is normally a low yield process. If the costly deposition processes for the electrode and the insulation layer 304 do not need to be done on the container, the overall costs after yield lost can be improved.

FIG. 1 shows two states of an adjustable optical lens according to an embodiment of the present invention, schematically illustrated in a sectional view. An optical fluid 102 is enclosed in between a rigid support 101 and a deformable membrane 103, both elements forming a container. The deformable membrane 103 is advantageously made of elastomers such as silicon rubber, acrylic dielectric elastomer, duroplastic elastomers, thermoplastic elastomers or polyurethane. The deformable membrane 103 may be fixed directly or indirectly to the support 101 by means of adhesive, welding, clamping or other bonding methods. The deformable membrane 103 preferably is pre-stretched.

At the very top of FIG. 1a there is an illustration of the different portions of the membrane 103: Portion 1031 denotes the interior portion of the membrane 103, and portion 1032 denotes the periphery portion of the membrane 103.

A first deformable electrode 104 is interconnected to the deformable membrane 103, in particular to the periphery portion 1032 of the membrane 103. The first electrode 104 directly is attached to the membrane 103. A second rigid electrode 106 is applied to the bottom side of a rigid holder 107—in the present example having the form of a ring—and insulated by a thin insulation layer 105 versus the first electrode 104, the insulation layer 105 being applied to the second electrode 106. Second electrode 106 and insulation layer 105 face the first electrode 104. The holder 107 including the second electrode 106 and the insulation layer 105 is located on top of the container comprising the fluid 102. The holder 107 comprises a central opening for exposing the interior of the membrane 103 to light entering the device. A sloped portion of the holder 107 includes at least a part of the second electrode 106 facing at least a part of the first electrode 104. The electrodes 104 and 106 interact and build a zipper actuator. When a voltage V is applied to the electrodes 104 and 106, the flexible electrode 104 and the rigid electrode 106 attract each other due to Coulomb forces.

FIG. 1a illustrates the optical lens in a state where no voltage V=0 is applied to the electrodes 104 and 106. The membrane 103 is in a convex state at least in its interior region due to pre-stretching or due to the quantity of fluid being inserted between the membrane 103 and the support 101 exceeding the quantity allowing the membrane 103 to rest in a relaxed state. In the convex state as depicted in FIG. 1a, the light is focused to a first focal point.

FIG. 1b in turn illustrates the optical lens in a state where a voltage V1>0 is applied to the electrodes 104 and 106, i.e. a voltage difference V≠0 is applied between the electrodes 104 and 106. This causes the first electrode 104 being attracted towards the stationary second electrode 106 by that lifting the periphery 1032 of the membrane 103 axially away from the support 101. This again results in a deformation of the deformable membrane 103 into its concave state as shown in FIG. 1b in which the interior of the membrane is pulled down towards the support 101. The reason for the membrane 103 taking such shape is that by lifting the periphery of the membrane 103 low pressure results in the bottom region of the container pulling down the membrane 103 towards the support 101 due to the constant volume of the fluid in the container. In turn, such motion of the membrane 103 causes a displacement of the fluid 102 from the centre of the container to its periphery. In the concave state as depicted in FIG. 1b, the light is defocused.

FIG. 1c illustrates another aspect of this embodiment. The cross-sectional shape of the rigid electrode 106 can be optimized to compensate for nonlinear effects, with the goal that the lens deflection is approximately linear to the applied voltage. With an electrode shape as shown in FIG. 1c, the contact angle between the first electrode 104 and the insulation layer 105 grows with increasing voltage. At the same time, the restoring force caused by the membrane 103 increases. An example for an optimized electrode shape is depicted in FIG. 1c. The S-shape profile of the second electrode 106 causes the contact angle between the first electrode 104 and the insulation layer 105 to be initially flat, so the zipping actuation has stable starting conditions. Then, as the voltage increases, the contact angle is kept small, in a way that the lens deflection is linear in respect to the growing electrostatic force.

FIGS. 2a and 2b show a version of the embodiment described in FIG. 1a, where the bottom of the container is sealed with a second membrane 121. As the liquid pressure changes during actuation, this secondary membrane 121 deforms accordingly, as shown in FIG. 2b, and amplifies the change in optical power. The second membrane 121 also acts as support in connection with support 101 for holding the fluid 102 between the membrane 103 and the support, i.e. the second membrane 121 in this embodiment.

FIG. 3 depicts another embodiment of the present invention in two states, i.e. the convex state and the concave state. This embodiment basically resembles the embodiment of FIG. 1 except for a shaper element 109 introduced in FIG. 3.

For miniaturized optical systems, it is highly important, that the optically transparent opening of the lens is well centred with respect to the optical axis of an optical system the optical lens may be integrated in. To achieve this, an additional membrane defining structure—also called shaper element 109—is used to define the shape of the deformable membrane 103. This shaper element 109 can be referenced to a housing of an optical system utilizing the present optical lens. Generally, the shaper element 109 shall limit a lateral extension of the shape of the membrane 103 in particular in a state when the actuator effects the highest position of the periphery of the membrane 103 and consequently a concave shape of the interior of the membrane 103. This helps positioning the lens precisely with respect to the optical system since the rigid shaper element 109 is arranged at a defined position with respect to the optical system, in particular in a lateral direction. Without the usage of a shaper element 109 the interior of the membrane 103 may be deviated laterally impacting the focal point. Advantageously, the shaper element 109 is arranged between the interior and the periphery of the membrane 303.

Preferably, the shaper element 109 is fixed to the holder 107 and builds sort of an enclosure for the actuator electrodes 104 and 106. By such arrangement the actuator can be protected from exposure to the environment. Preferably, the shaper element 109 is aligned with the form or the membrane 103, i.e. in case the membrane 103 takes the form of a circle, the shaper element 109 may take the form of an annulus.

Summarizing, the lens shaper element 109 is advantageous in applications in which a high optical quality and especially a good lens concentricity is required. In order to allow air exchange between the interior portion of the membrane 103 and the actuator section including the electrodes 104 and 106, air exchange holes 110 are included in the shaper element 109. The shaper element 109 can be bonded to the deformable membrane 103 or clamped by a clamping ring 111 having holes 112 for a fluid exchange between two chambers of the container built by the clamping ring 111 in order to allow a deformation of the membrane 103 in its convex and concave state.

Moreover, in the embodiment of FIG. 3, an additional optical element in form of an additional optical lens 113 is integrated into the support 101 and as such forms part of the container.

Figure 3A:
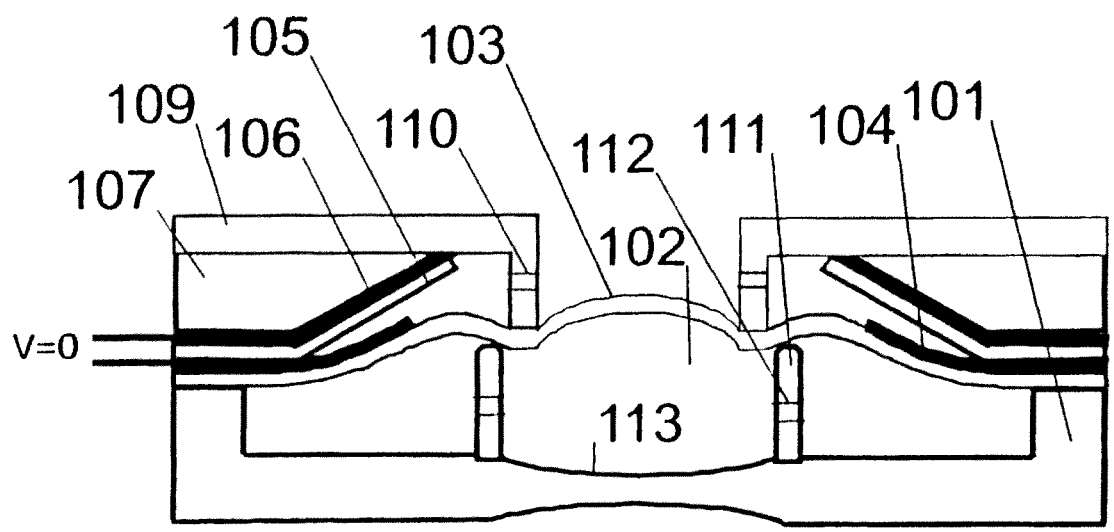
FIGS. 3a and 3b show two states of an adjustable optical lens according to a third embodiment of the present invention, schematically illustrated in a sectional view.
Figure 3B:
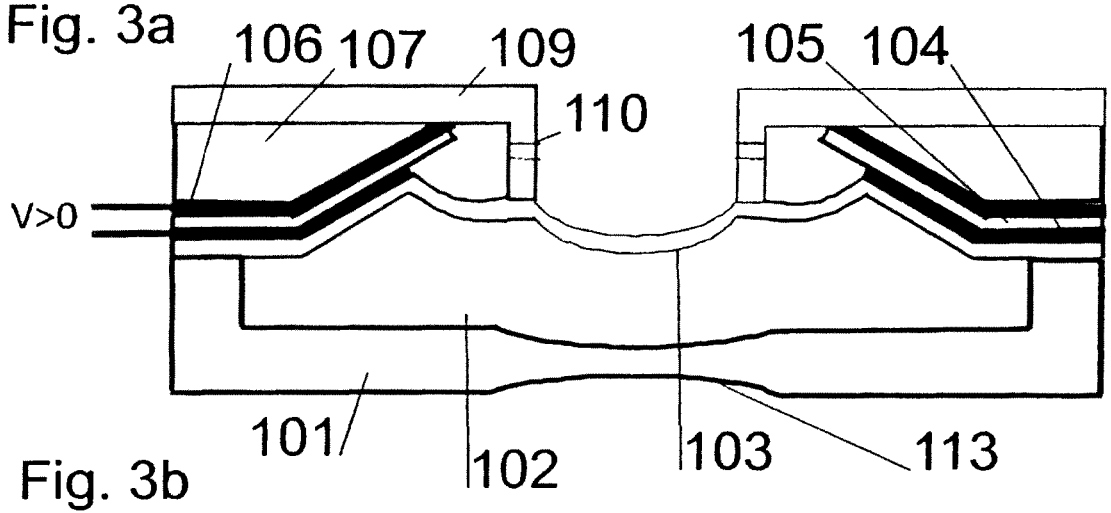

Again, FIG. 3a illustrates an optical lens in a convex state, i.e. the relaxed, non-actuated state, and FIG. 3b illustrates the optical lens in a concave state, i.e. the activated state.

FIG. 4 illustrates another embodiment of an optical lens according to the present invention. Such embodiment again provides a holder 107, for holding the second electrode 106 and the insulation layer 105 arranged at the sloped portion of the holder 107. The second electrode 106 is electrically connected to external electronics by means of a conductor 108 integrated into the holder 107. Air holes 110 allow for air exchange when the shape of the membrane 103 is changed. The inner part of the holder 107, defining the shape of the lens, does not have to be bonded or clamped to the membrane lens, because the membrane 103 is held in place by the electrostatic forces at the inner rim of the holder 107 when the lens is in its convace state.

The holder 107 simultaneously acts as shaper element for shaping the membrane 103 as described in connection with FIG. 2. The holder 107 shapes the membrane 103 by means of its sloped portion pressing on the membrane 103 as depicted in FIG. 4, which shows the lens in a convex state.

Figure 4A:
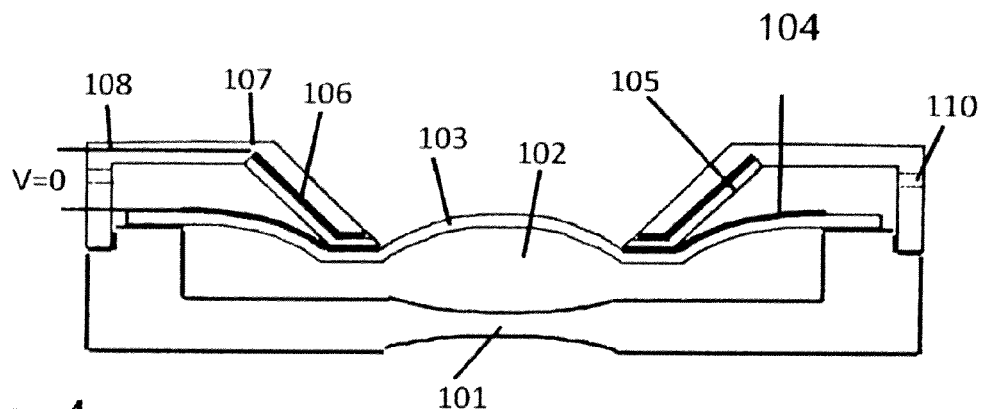
FIGS. 4a, 4b and 4c show states of an adjustable optical lens according to another embodiment of the present invention, schematically illustrated in a sectional view.
Figure 4B:
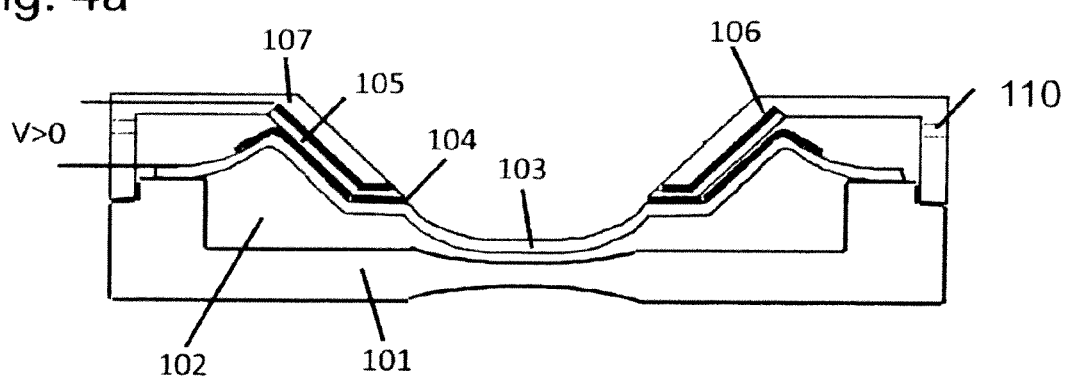

Again, by applying a voltage V>0 the electrodes 104 and 106 attract and the periphery of the membrane 103 is lifted causing the interior of the membrane 103 to lower, see FIG. 4b.

Figure 4C:
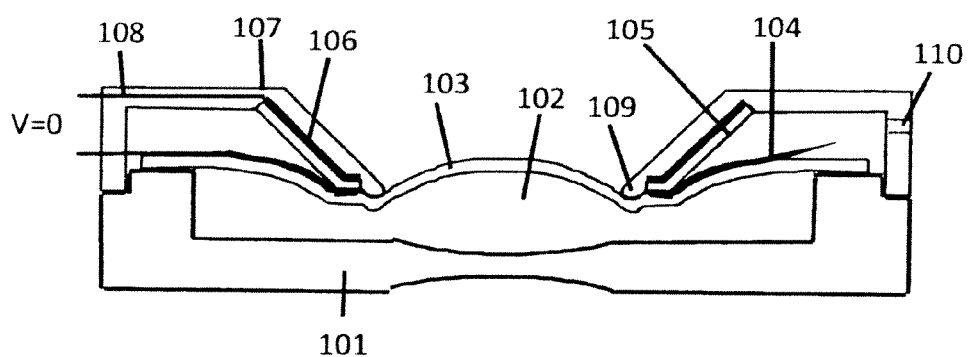

FIG. 4c shows another aspect of this embodiment. To achieve a high lens quality, the second electrode 106 is not applied all the way to the lens shaping element 109. The lens shaping element 109 is designed such, that the membrane 103 is always defined by the lens shaping element 109. This can improve the quality of the lens shape by the decoupling the lens shape from the actuator.

Figure 5A:
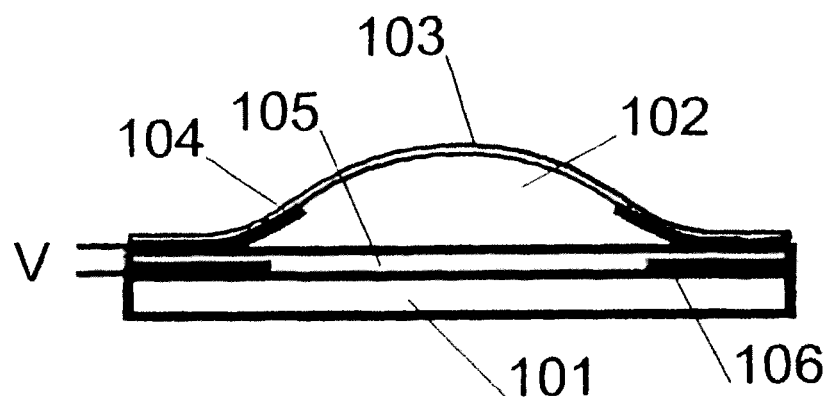

FIGS. 5, 6 and 7 show adjustable optical lenses according to another embodiment of the present invention. According to FIG. 5a, an optical fluid 102 is enclosed in a container formed by a rigid support 101 and a deformable membrane 103. The deformable membrane 103 is advantageously made of elastomers such as silicon rubber, acrylic elastomers, duroplastic elastomers, thermoplastic elastomers or polyurethanes. The deformable membrane 103 may be fixed directly to the support 101 by means of adhesive, welding, clamping or other bonding methods. The deformable membrane is preferably pre-stretched.

A first deformable electrode 104 is interconnected to the deformable membrane 103, in particular to the periphery portion 1032 of the membrane 103. In the present embodiment, the first electrode 104 is directly attached to the bottom side of the membrane 103 facing the support 101.

A second electrode 106 is applied onto the support 101. The second electrode 106 is electrically insulated from the first electrode 104 by means of a thin insulation layer 105 applied on top of the second electrode 106.

Figure 5B:
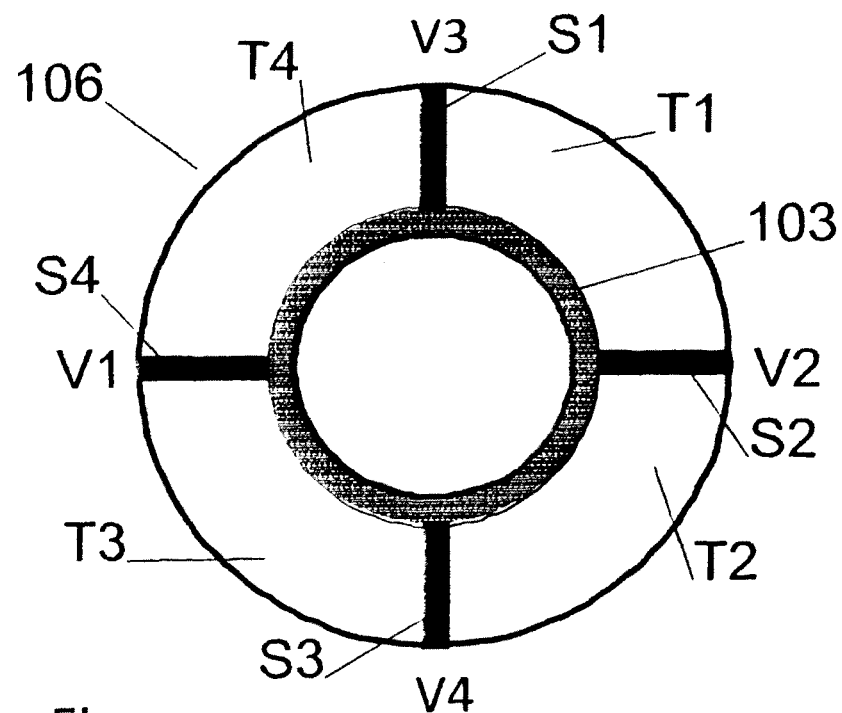

FIG. 5b illustrates the second electrode 106 of the lens in a top view. The second electrode 106 comprises four rigid and highly conductive first segments S1-S4. In addition, the second electrode comprises four high resistance second segments T1-T4. A conductivity of the first segments exceeds the conductivity of the second segments, in particular exceeds the conductivity of the second segments by far, i.e. by a factor of 1000. Each of the high resistance second segments advantageously shows a resistance per square in between 100 kOhm and 1 MOhm. Each of the high conductive first segments advantageously shows a resistance per square in between 1 Ohm and 1 kOhm. Each of the second segments T1-T4 is arranged between two of the first segments S1-S4 and is electrically contacted by these. The first electrode 104 and the segments S1-S4 and T1-T4 of the second electrode 106 build a set of zipper actuators. When a voltage V1 is applied between the first segment S4 and the first electrode 104 and a different voltage V3 is applied between the first segment S1 i.e. the neighbor segment to first segment S4 and the first electrode 104, a voltage gradient builds up across the second segment T4. Depending on the locally varying voltage between the second segment T4 and the first electrode 104, the Coulomb attraction force between the electrodes varies with location. This results in a non-radial symmetric deformation of the lens.

Figure 6A:
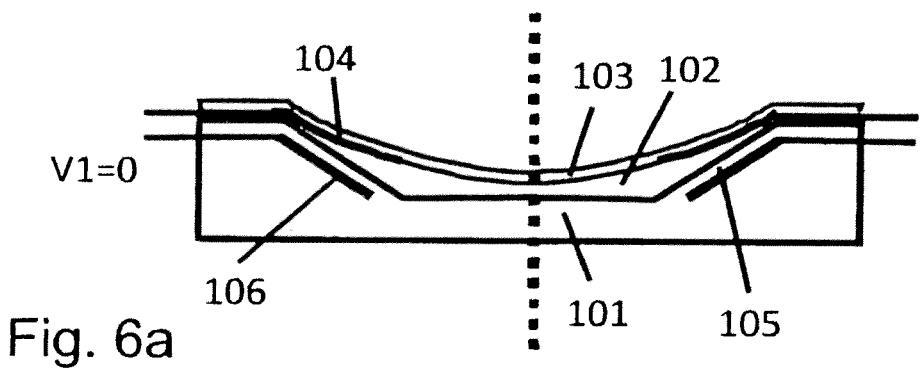
Figure 6B:
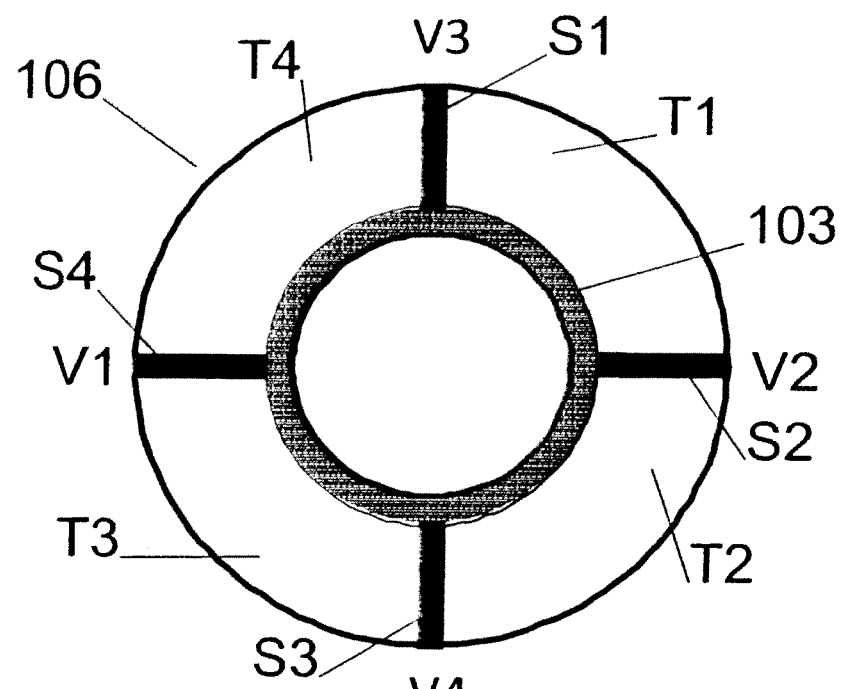

FIG. 6a illustrates a modified version of the lens of FIG. 5a with the present embodiment using a concave shaped support 101 with a second electrode 106, which follows the shape of the support 101. This modification enables a tuning of the lens from concave to convex and the option of moving the center of the lens in lateral direction. FIG. 6b illustrates the second electrode 106 of the lens in a top view, which second electrode is identical to the second electrode 106 used in the lens of FIG. 5

Figures 7A, 7B, 7C:
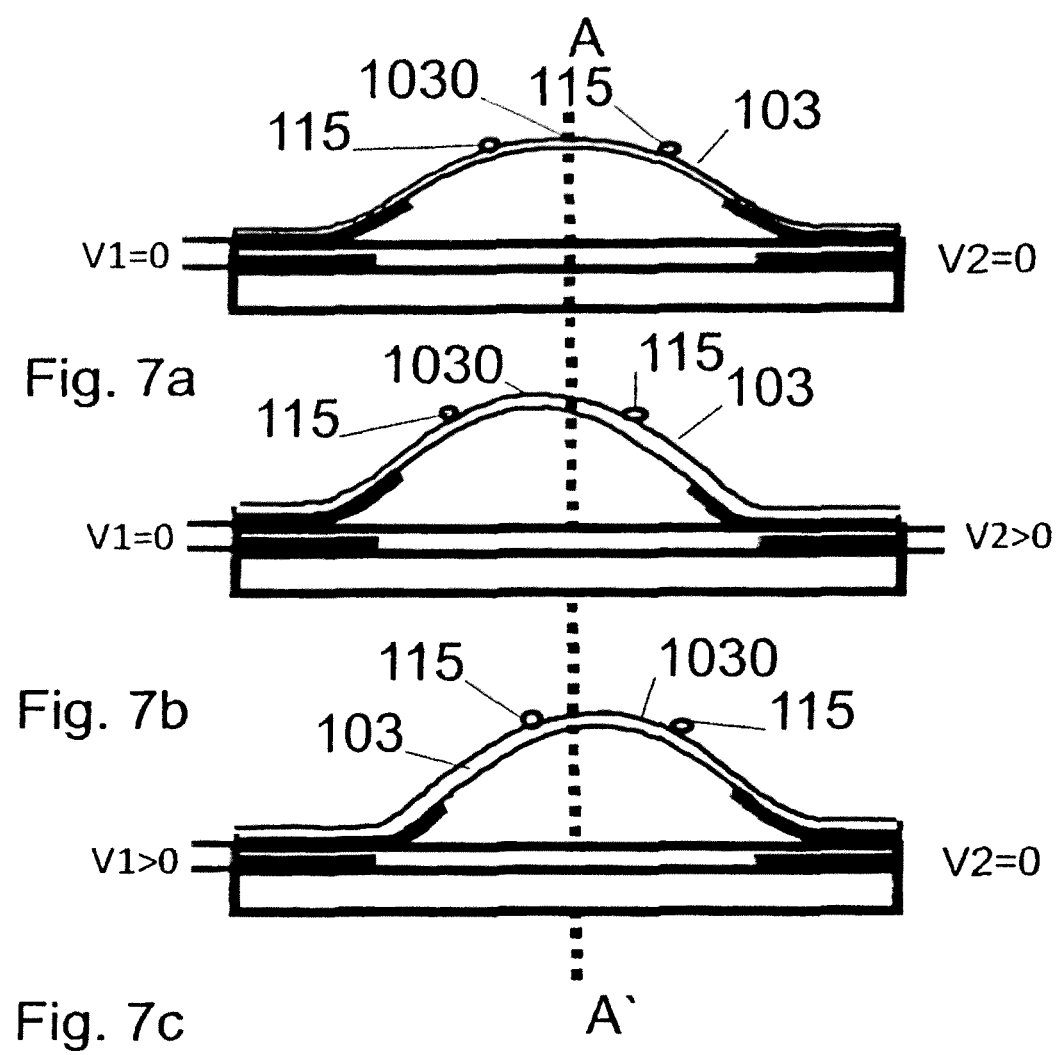
FIGS. 7a, 7b and 7c illustrate the optical lens of FIG. 5 in three different activation states, all in a sectional view.

FIGS. 7a, 7b and 7c illustrate the optical lens of FIG. 5 in three different activation states, all in a sectional view. For illustration purposes, many reference signs are omitted which can be derived from FIG. 5a if needed. FIG. 7a illustrates the lens in a deactivated or relaxed state. Voltages V1 between the first electrode 104 and the first segment S4 of second electrode 106 is set to zero, as is voltage V2 between the first electrode 104 and the first segment S2 of the second electrode 106. So are voltages V3 and V4 between the first segments S1 and S3, and the first electrode, respectively. As shown in FIG. 7a, the membrane 103 is in a convex state, and is centred, i.e. its peak 1030 is on axis A-A' which denotes the centre of a symmetrical membrane without any external forces applied.

In FIG. 7b, different voltages are applied which make the peak 1030 of the membrane 103 become off-centred. This constitutes a non-radial symmetric deformation of the lens as mentioned above. This non-radial deformation can be used to move the optical axis of the lens. In FIG. 7b the peak 1030 of the membrane is moved to the left with respect to the axis A-A'. This is a result of applying a voltage V1 equal zero between the first segment S4 of the second electrode 106 and the first electrode 104, and voltages V3=V4 between the segments S1 and S3, respectively, and the first electrode 104, and voltage V2 between the first segment S2 and the first electrode 104 such the inequation of voltages V2>V3>V1 is respected. Due to the voltage gradients built across second segments T1-T4 the peak 1030 of the membrane is shifted to the left.

FIG. 7c shows the opposite situation in which the axial centre of the lens is moved in the opposite direction, i.e. to the right. This is a result of applying a voltage V2 equal zero between the first segment S2 of the second electrode 106 and the first electrode 104, and voltages V3=V4 between the segments S1 and S3 respectively and the first electrode 104, and voltage V2 between the first segment S2 and the first electrode 104 such that the inequation of voltages V1>V3>V2 is respected. Due to the voltage gradients built across second segments T1-T4 the peak 1030 of the membrane is shifted to the right.

Therefore, depending on the applied voltages V1-V4, the lens can be moved in planar direction. This effect can be used for image stabilization. When all voltages V1-V4 are kept to equal size, the focal length of the lens can be adjusted without moving the centre of the lens. By applying an offset voltage component and a varying component to voltages V1 to V4, the focusing effect can be combined with a displacement effect.

Furthermore, a rigid ring 115 can be placed on the membrane 103. This ring helps to compensate for inhomogeneous membrane deformation due to non-homogeneous deformations of the lens when shifting the center of the lens using the electrostatic actuation. The rigid ring 115 can move with the membrane and acts as a laterally moveable lens shaper, which defines the shape of the lens.

Furthermore, if the voltages V1=V2 and the voltages V3=V4 and V1≠V3, then the lens deforms non-symmetric, resulting in an elliptical lens.

The first segments S1-S4 of the second electrode 106 and the second segments T1-T4 of the second electrode 106 can have any geometry, including circular, rectangular and any other suitable shape. All or some first segments S1-S4 of the second electrode 106 can also be placed such that they contact only one second segment T1-T4 of the second electrode 106. For at least shifting the peak/centre of the membrane to some extent, a minimum configuration of a second electrode seems to provide two first segments S1-S4 of the second electrode 106 and one second segment T1-T4 in between the two first segments S1-S4. Provided the second electrode shows a circumferential shape such as a ring, for example, for at least shifting the peak/centre of the membrane to some extent, a minimum configuration of a second electrode seems to provide two first segments S1-S4 two second segments T1-T4, each of the second segments T1-T4 being arranged in between the two first segments S1-S4.

A further embodiment of the present invention is presented in FIGS. 8 and 9.

Figure 8A:
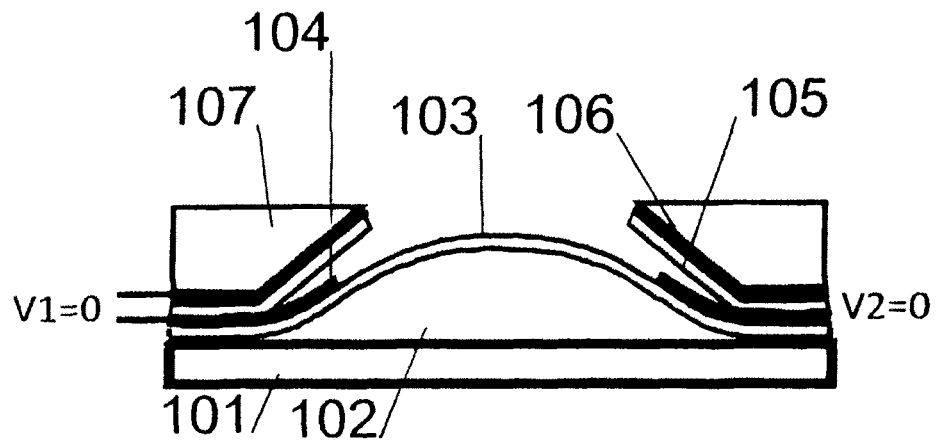

FIG. 8a shows an adjustable lens identical to the lens as depicted in FIGS. 1a and 1b, however, including a second electrode 106 being more sophisticated than the one used in connection with FIG. 1 for the sake of enabling the centre of the membrane to be shifted.

Again, in such very compact embodiment, the membrane embodied as a polymer film is deformed through electrostatic forces. A first ring-shaped flexible electrode 104 is applied onto or integrated into the periphery of the polymer film membrane. The deformable membrane 103 is advantageously made of elastomers such as silicon rubber, acrylic elastomer, duroplastic elastomers, thermoplastic elastomers or polyurethane. The deformable membrane 103 may be fixed directly or indirectly to the support 101 by means of adhesive, welding, clamping or other bonding methods. The deformable membrane 103 preferably is pre-stretched. A second ring-shaped electrode 106 is put at the periphery of the support 101 where the support 101 meets the membrane 103. In between the first and the second ring-shaped electrodes 104, 106 there is provided a thin insulation layer 105 for decoupling the second electrode 106 from the first electrode 104. The electrodes 104, 106 in combination with the insulator build a zipper actuator. The second electrode 106 and the insulation layer 105 are attached to a ring shaped holder 107. Such assembly including the holder 107, the second electrode 106 and the insulating layer 105 may be an assembly manufactured separate from the rest of the lens, and attached to the membrane/support assembly during fabrication. When an electrical voltage is applied between the flexible first electrode 104 and the rigid second electrode 106, electrostatic forces build up and the flexible electrode 104 is attracted towards the second electrode. The deformation of the flexible electrode 104 causes a deformation of the membrane 103 and thus a displacement of the fluid in the container. The displacement of the fluid from the centre of the container to its periphery results in a change of the shape of the membrane 103.

An advantage of this embodiment is that no fluid 102 can be enclosed in between the electrodes 104, 106 and therefore, no variation of the thickness of the insulation layer 105 can occur due to fluid enclosure. Furthermore, the sealing of the fluid normally is a low yield process. If the costly deposition processes for the second electrode 106 and the insulation layer 105 do not need to be done on the container, the overall costs after yield lost can be improved.

A first deformable electrode 104 is interconnected to the deformable membrane 103, in particular to the periphery portion 1032 of the membrane 103. The first electrode 104 directly is attached to the membrane 103. A second rigid electrode 106 is applied to the bottom side of a rigid holder 107—in the present example having the from of a ring—and insulated by a thin insulation layer 105 versus the first electrode 104, the insulation layer 105 being applied to the second electrode 106. Second electrode 106 and insulation layer 105 face the first electrode 104. The holder 107 including the second electrode 106 and the insulation layer 105 is located on top of the container comprising the fluid 102. The holder 107 comprises a central opening for exposing the interior of the membrane 103 to light entering the device. A sloped portion of the holder 107 includes at least a part of the second electrode 106 facing at least a part of the first electrode 104. The electrodes 104 and 106 interact and build a zipper actuator. When a voltage V is applied to the electrodes 104 and 106, the flexible electrode 104 and the rigid electrode 106 attract each other due to Coulomb forces.

Figure 8B:
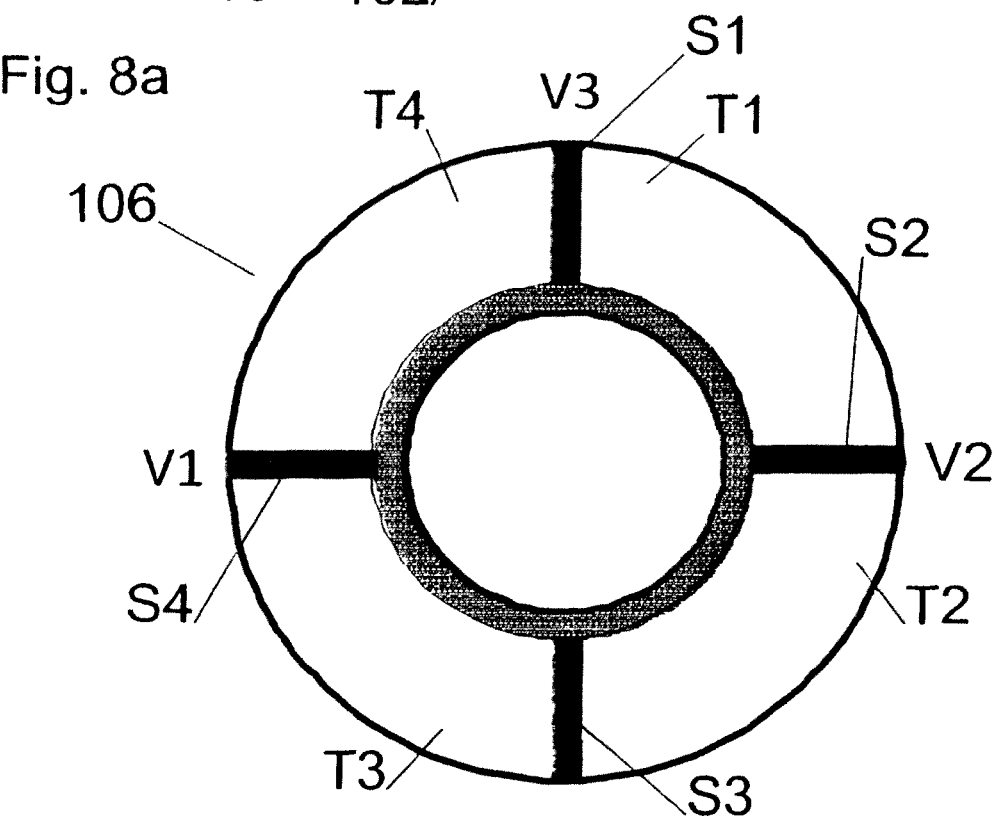

FIG. 8b illustrates the second electrode 106 of the lens in a top view. This second electrode 106 is identical to the second electrode as used in the embodiment referred to in FIG. 5. For this reason, for details with respect to the design and function of the second electrode it is referred to the description of the second electrode of FIG. 5b.

FIGS. 9a, 9b and 9c illustrate the optical lens of FIG. 8 in three different activation states, all in a sectional view. For illustration purposes, many reference signs are omitted which can be derived from FIG. 6a if needed. FIG. 9a illustrates the lens in a deactivated or relaxed state. Voltages V1 between the first electrode 104 and the first segment S4 of second electrode 106 is set to zero, as is voltage V2 between the first electrode 104 and the first segment S2 of the second electrode 106. So are voltages V3 and V4 between the first segments S1 and S3, and the first electrode respectively. As shown in FIG. 9a, the membrane 103 is in a convex state, and is centred, i.e. its peak 1030 is on axis A-A' which denotes the centre of a symmetrical membrane without any external forces applied.

In FIG. 9b, different voltages are applied which make the peak 1030 of the membrane 103 become off-centred. This constitutes a non-radial symmetric deformation of the lens as mentioned above. This non-radial deformation can be used to move the optical axis of the lens. In FIG. 9b the peak 1030 of the membrane is moved to the right with respect to the axis A-A'. This is a result of applying a voltage V1 equal zero between the first segment S4 of the second electrode 106 and the first electrode 104, and voltages V3=V4 between the segments S1 and S3, respectively, and the first electrode 104, and voltage V2 between the first segment S2 and the first electrode 104 such that the inequation of voltages V2>V3>V1 is respected. Due to the voltage gradients built across second segments T1-T4 the peak 1030 of the membrane is shifted to the right.

FIG. 9c shows the opposite situation in which the axial centre of the lens is moved in the opposite direction, i.e. to the left. This is a result of applying a voltage V2 equal zero between the first segment S2 of the second electrode 106 and the first electrode 104, and voltages V3=V4 between the segments S1 and S3, respectively, and the first electrode 104, and voltage V2 between the first segment S2 and the first electrode 104 such that the inequation of voltages V1>V3>V2 is respected. Due to the voltage gradients built across second segments T1-T4 the peak 1030 of the membrane is shifted to the right.

Therefore, depending on the applied voltages V1-V4, the lens can be moved in planar direction. This effect can be used for image stabilization. When all voltages V1-V4 are kept to equal size, the focal length of the lens can be adjusted without moving the centre of the lens. By applying an offset voltage component and a varying component to voltages V1 to V4, the focusing effect can be combined with a displacement effect. Furthermore, a rigid ring 115 as shown in FIG. 7 can be place on the membrane 103. This ring helps to compensate for inhomogeneous membrane deformation due to non-homogeneous deformations of the lens when shifting the center of the lens using the electrostatic actuation. The rigid ring can move with the membrane and acts as a laterally moveable lens shaper, which defines the shape of the lens.

Furthermore, if the voltages V1=V2 and the voltages V3=V4 and V1≠V3, then the lens deforms non-symmetric, resulting in an elliptical lens.

The first segments S1-S4 of the second electrode 106 and the second segments T1-T4 of the second electrode 106 can have any geometry, including circular, rectangular and any other suitable shape. All or some first segments S1-S4 of the second electrode 106 can also be placed such that they contact only one second segment T1-T4 of the second electrode 106. For at least shifting the peak/centre of the membrane to some extent, a minimum configuration of a second electrode seems to provide two first segments S1-S4 of the second electrode 106 and one second segment T1-T4 in between the two first segments S1-S4. Provided the second electrode shows a circumferential shape such as a ring, for example, for at least shifting the peak/centre of the membrane to some extent, a minimum configuration of a second electrode seems to provide two first segments S1-S4 two second segments T1-T4, each of the second segments T1-T4 being arranged in between the two first segments S1-S4.

Figure 10A:
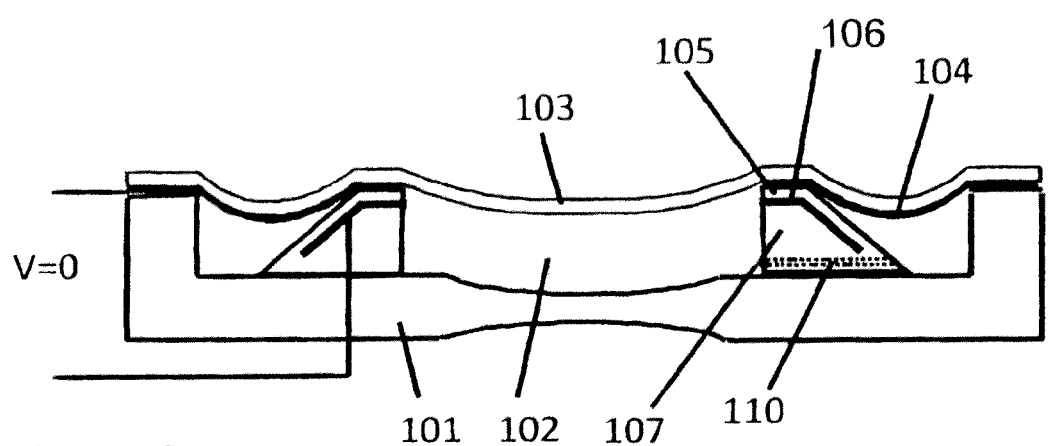
FIGS. 10a and 10b show two states of an adjustable optical lens according to a further embodiment of the present invention, schematically illustrated in a sectional view.
Figure 10B:
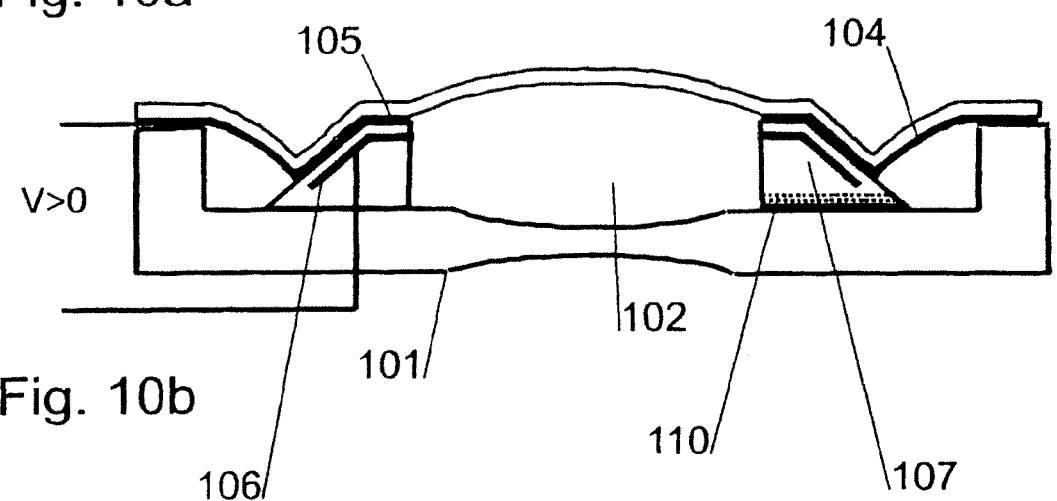

FIGS. 10a and 10b show another version of a convex-concave electrostatic lens similar to the embodiment shown in figure FIGS. 4A and 4B.

In this embodiment, the holder 107 is located within the optical fluid 102, which is enclosed by the deformable membrane 103 and the support 101. The holder 107 contains a second electrode 106 and a thin insulation layer 105. The fluid volume can be chosen such that the membrane is concave in its passive state, as shown in FIG. 10a. When a voltage is applied between a first electrode 104, which is interconnected to the membrane 103, and the second electrode 106, as depicted in FIG. 10b, the optical fluid 102 flows through the exchange hole 110 from the periphery into the center of the lens. The main advantage of this embodiment is that the holder 107 acts as lens shaper, giving the lens a defined circumference. If the lens is concave in passive state, no bonding of the holder 107 to the membrane 103 is required, because the membrane is held in place by the electrostatic forces in active state. The main advantage compared to the embodiment shown in FIG. 4 is that the membrane 103 can change from concave/planar to planar/convex lens configuration when going from passive to active state.

Support 101 and holder 107 can be one piece or two separate pieces, manufactured for instance using injection molding. If injection molding is used to create the support 101 and holder 107 in one part, the exchange hole 110 can be created using an inset tube. Alternatively, the piece can be mounted in the injection molding device in a tilted fashion, and a side action tool can produce the opening.

Figures 11A, 11B, 11C:
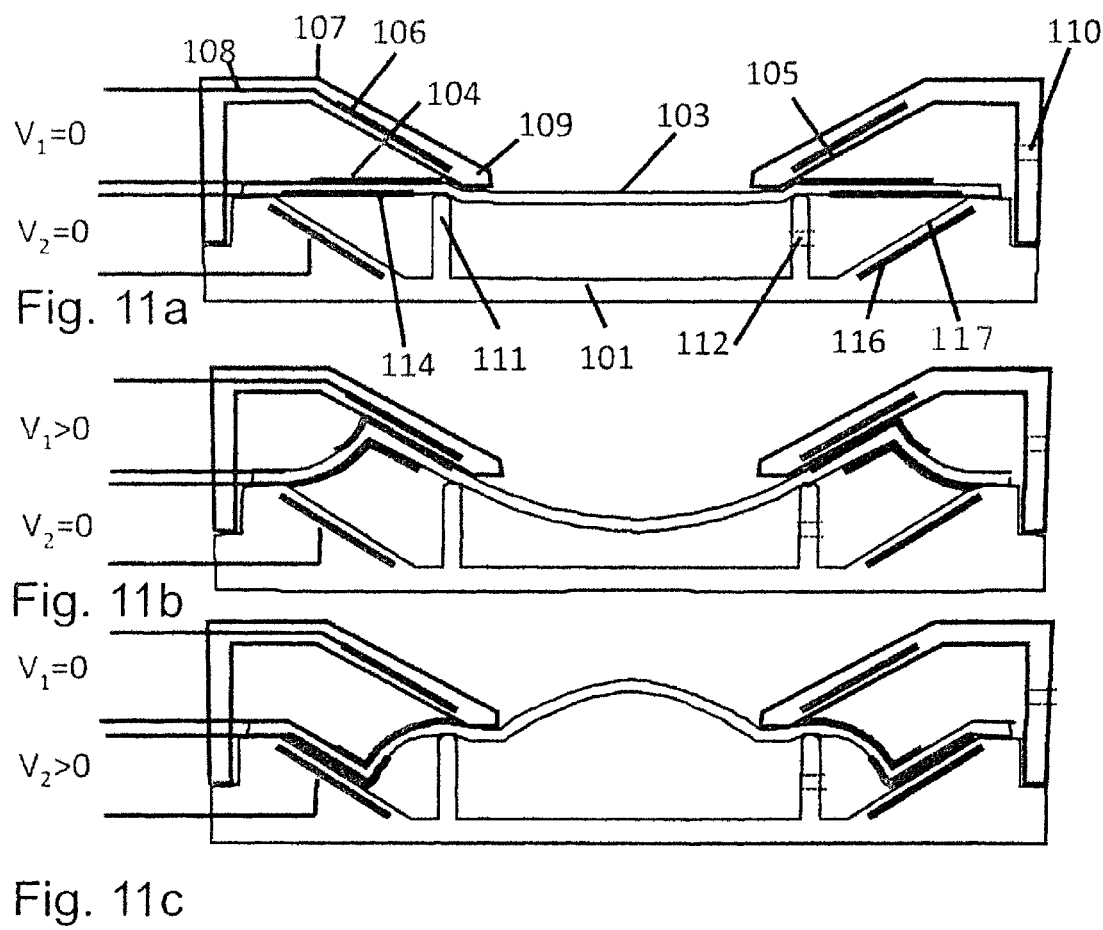
FIGS. 11a, 11b and 11c show three states of an adjustable optical lens according to a further embodiment of the present invention, all in a sectional view.

FIGS. 11a, 11b and 11c show a different embodiment of the invention. The membrane 103 is interconnected to two deformable electrodes 104 and 114, i.e. the first electrode 104 and the third electrode 114, one on each side of the membrane 103. First electrode 104 forms a zipper actuator with the second electrode 106, i.e. the rigid electrode, which is isolated by a thin insulation layer 105. Third electrode 114 and fourth electrode 116, i.e. a rigid electrode again, form a second zipper actuator, which is embedded in a support 101 and isolated by a thin insulation layer 117. When a voltage $V_1$ is applied between first and second electrodes 104 and 106, the center of the deformable membrane 103 is moved towards the support 101. When a voltage $V_2$ is applied between third and fourth electrodes 114 and 116, the central section of the deformable membrane 103 forms a convex lens. During actuation, exchange holes 110 and 112 allow fluid 102 and air displacement. An inner rim of the holder 107 acts as lens shaper element 109 giving the lens a defined circumference.

In case the membrane 103 is not bonded to the shaper element 109, the air exchange holes 110 may be omitted. Similarly, in case the membrane 103 is not bonded to a retainer 111, the hole for liquid exchange 112 may be omitted. The liquid stream would then pass between the membrane 103 and the retainer 111, the air stream between the membrane 103 and the lens shaping element 109. This can make the production more easy with a trade-off in lens controllability and speed.

Materials and manufacturing methods as suggested in the following hold for all embodiments described in the FIGS. 1 to 11.

The first electrode 104 preferably is deformable without being damaged. Advantageously, the first electrode 104 and possibly the second electrode 106 are therefore manufactured from one of the following materials, which also holds for the third electrode 114:

- Carbon nanotubes (see "Self-clearable carbon nanotube electrodes for improved performance of dielectric elastomer actuators", Wei Yuan et al, Proc. SPIE, Vol. 6927, 69270P (2008));
- Carbon black (see "Low voltage, highly unable diffraction grating based on dielectric elastomer actuators", M. Aschwanden et al., Proc. SPIE, Vol. 6524, 65241N (2007));
- Carbon grease/conducting greases;
- Metal ions (Au, Cu, Cr, ...) (see "Mechanical properties of electroactive polymer microactuators with ion-implanted electrodes", S. Rosset et al., Proc. SPIE, Vol. 6524, 652410 (2007));
- Liquid metals (e.g. Galinstan);
- Metallic powders, in particular metallic nanoparticles (Gold, silver, copper);
- Metal films
- Conducting polymers (intrinsically conducting or composites);

The electrodes 104 and 106 may be deposited by means of any of the following techniques, which also holds for the electrodes 114 and 116:

- Spraying;
- Ion-implantation (see "Mechanical properties of electroactive polymer microactuators with ion-implanted electrodes", S. Rosset, Proc. SPIE, Vol. 6524, 652410 (2007));
- PVD, CVD;
- Evaporation;
- Sputtering;
- Photolithography;
- Printing, in particular contact printing, inkjet printing, laser printing, and screen printing;
- Field-guided self-assembly (see e.g. "Local surface charges direct the deposition of carbon nanotubes and fullerenes into nanoscale patterns", L. Seemann, A. Stemmer, and N. Naujoks, Nano Letters 7, 10, 3007-3012, 2007);
- Brushing;
- Electrode plating;

Optionally, the support 101 can contain optical elements with suitable shapes e.g. be:

- Spherical lenses (convex and concave);
- Fresenel lenses;
- Cylindrical lenses;
- Aspherical lenses (convex and concave);
- Flat;
- Mirrors;
- Squares, triangles, lines or pyramids;
- Any micro- (e.g. micro lens array, diffraction grating, hologram) or nano- (e.g. antireflection coating) structure can be integrated into the support 101 and the deformable membrane 103. When an anti-reflective layer is applied to at least one surface of the deformable membrane 103, it is advantageously formed by fine structures having a size smaller than the wavelength of the transmitted light. Typically, this size may be smaller than 5 µm for infrared applications, smaller than 1 µm for near-infrared applications, and smaller than 200 nm for applications using visible light.

Any of the following methods can e.g. be used to form the anti-reflection coating:

- Casting, in particular injection molding/mold processing;
- Nano-imprinting, e.g. by hot embossing nanometer-sized structures;
- Etching (e.g. chemical or plasma);
- Sputtering;
- Hot embossing;
- Soft lithography (i.e. casting a polymer onto a pre-shaped substrate);
- Chemical self-assembly (see e.g. "Surface tension-powered self-assembly of microstructures—the state-of-the-art", R. R. A. Syms, E. M. Yeatman, V. M. Bright, G. M. Whitesides, Journal of Microelectro-mechanical Systems 12(4), 2003, pp. 387-417);
- Electro-magnetic field guided pattern forming (see e.g. "Electro-magnetic field guided pattern forming", L. Seemann, A. Stemmer, and N. Naujoks, Nano Lett., 7 (10), 3007-3012, 2007. 10.1021/n10713373).

The material for the support 101 can e.g. comprise or consist of:

- PMMA;
- Glass;
- PS;
- Plastic;
- Polymer;
- Crystalline material, in particular single crystal material.
- Metals Any of the following methods can e.g. be applied for forming and structuring the support 101:

- Grinding;
- Injection molding;
- Milling;
- Casting.

The material for the opaque fluid 102 can e.g. comprise or consist of:

- Oils;
- Solvents;
- Ionic liquids;
- Gas.

The material for the deformable membrane 103 can e.g. comprise or consist of:

- Gels (Optical Gel OG-1001 by Liteway™),
- Elastomers (TPE, LCE, Silicones e.g. PDMS Sylgard 186, Acrylics, Urethanes);

Thermoplast (ABS, PA, PC, PMMA, PET, PE, PP, PS, PVC, . . . );

Duroplast.

To prevent the first electrode (104, 114) from permanently sticking to the insulation layer (105, 117), the insulation layer is coated with an anti-stick layer such as:

Self assembled monolayer

Teflon

Perfluorocarbons.

The self assembled monolayer (SAM) can, e.g., comprise molecules with

Molecule tail groups comprising or consisting of regular or perfluorinated alkyl chains and/or Molecule head groups comprising or consisting of silane or phosphoric acid.

As an alternative way to prevent the first electrode from sticking, the surface roughness of the insulation layer (105, 117) may be increased by nanostructuring.

The insulation layer 105, 117 can, e.g., comprise or consist of:

$Al_2O_3$, $SiO_2$, $Si_3N_4$

Parylene

Epoxy, PVDF (Poly Vinylidene diFluoride)

Electric resins: SU-8, Cyclotene (BCB based),

High-k dielectrics such as $TiO_2$, $HfO_2$ or $ZrO_2$

Nanocomposites consisting of high-k nanoparticles (such as $BaTiO_3$) in a polymer matrix.

The insulation layer 105, 117 can, e.g., be deposited by means of any of the following techniques:

PVD (Evaporation, sputtering)

CVD (ALD, PECVD, . . . )

Spin-coating

Anodization

Spray pyrolysis

The geometries of the electrodes 104, 106, 114, 116 can be round, square or take any other appropriate form. The geometry of the membrane 103 and/or the support 101 can be round, square or take any other appropriate form.

Overall, the light transmission path of the optical lens does not interfere with actuator elements. The deformation of the deformable membrane may depend on a distribution of the elastic modulus, a local distribution of the membrane thickness, a shape of the membrane shaper—if available—as well as the membrane deformation mechanism, if no membrane shaper is used. The shape of the support as well as of the deformable membrane and the electrodes can be adapted to various applications. In particular, the electrodes, the membrane, the holder, the shaper as well as the optical element as such can be of any suitable shape and e.g. be triangular, rectangular, circular or polygonial. The first and second electrodes can also have annulus shape.

The adjustable optical lens can be used in a large variety of applications, such as:

Projection devices, e.g. for applications in the optical part of projectors for macro- and micro-projectors in beamers and hand-held devices;

Displays; Microscopes;

Cameras; Surveillance cameras;

Vision systems, having any kind of camera;

In research applications;

Lighting applications such as illumination for shops, retail, museums or home applications;

Telecommunication applications (amplitude modulation).

While there are shown and described presently preferred embodiments of the invention, it is to be distinctly understood that the invention is not limited thereto but may be otherwise variously embodied and practiced within the scope of the following claims.

The invention claimed is:

1. An adjustable optical lens, comprising
   a membrane,
   a support for the membrane,
   a fluid between the membrane and the support,
   an actuator for deforming the membrane, and
   a rigid ring connected to the membrane for moving with the membrane in lateral and axial direction for ensuring that a section of the membrane surrounded by the rigid ring has a defined circumference.

2. The adjustable optical lens of claim 1 wherein said actuator for deforming the membrane comprises a first electrode and a second electrode and
   wherein said adjustable optical lens further comprises a holder for holding the second electrode.

3. The adjustable optical lens of claim 2 wherein said first electrode is interconnected to the membrane, and
   wherein the second electrode is arranged above the membrane such that the first electrode is arranged between the support and the second electrode.

4. A method for operating the optical lens of claim 3 the method comprising steps of:
   applying a first voltage between the first electrode and the second electrode for moving the periphery of the membrane away from the support for effecting a moving of the interior of the membrane towards the support, and
   applying a second voltage between the first electrode and the second electrode for moving the periphery of the membrane towards the support for effecting a moving of the interior of the membrane away from the support.

5. The adjustable optical lens of claim 2, wherein the second electrode comprises first segments with a first conductivity and at least one second segment with a second conductivity, wherein the first conductivity exceeds the second conductivity, and wherein each one of the second segments is arranged between two of the first segments.

6. The optical lens of claim 5, wherein the number of the first and the second segments each is at least three.

7. The optical lens of claim 6, wherein the number of the first and the second segments each is four.

8. A method for operating the optical lens of claim 5, the method comprising steps of:
   applying a first voltage between the first electrode and a first one of the first segments of the second electrode, and
   applying a second voltage between the first electrode and a second one of the first segments of the second electrode,
   wherein the first and the second ones of the first segments are neighbouring first segments with a single second segment in between, and wherein the first voltage is different from the second voltage, causing a lateral displacement of a peak of the lens.

9. The optical lens of claim 2, wherein the second electrode is electrically insulated from the first electrode through an insulation layer interconnected with the second electrode.

10. The optical lens of claim 9, wherein the holder comprises an optically transparent central opening and a sloped portion including at least a part of the second electrode facing at least a part of the first electrode, wherein the second electrode and the insulation layer are arranged at a bottom surface of the holder facing the first electrode, and wherein a part of the insulation layer is interconnected with a part of the first electrode.

11. The optical lens of claim 2, wherein a cross section of the second electrode has one of the shapes of the group of rounded, s-shaped, straight, and kinked.

12. The optical lens of claim 2 wherein the second electrode is a circumferential electrode.

13. A method for fabricating the adjustable optical lens of claim 2, comprising steps of
   filling the fluid into the support,
   attaching the membrane to the support, and
   arranging a pre-fabricated holder including the second electrode on top of the membrane.

14. The optical lens of claim 1, wherein the membrane comprises an interior and a periphery, and wherein the actuator is designed such that it solely engages with the periphery of the membrane, wherein moving the periphery away from the support effects a moving of the interior towards the support, and wherein moving the periphery towards the support effects a moving of the interior away from the support.

15. The optical lens of claim 1, wherein the membrane is pre-stretched.

16. The optical lens of claim 1, comprising at least one of the following material properties:
   the membrane being transparent and elastic;
   at least a portion of the support being transparent.

17. The optical lens of claim 1 comprising a shaper element defining a shape of an interior of the membrane.

* * * * *